(12) United States Patent
Menozzi et al.

(10) Patent No.: US 9,359,485 B2
(45) Date of Patent: Jun. 7, 2016

(54) USE OF NON-IONIC SURFACTANTS TO INCREASE OXYGEN SCAVENGER ACTIVITY OF FUNCTIONALIZED POLYOLEFIN FILMS

(75) Inventors: Edoardo Menozzi, Basel (CH); Enrico Galfré, Basel (CH)

(73) Assignee: ALBIS PLASTIC GmbH, Hamburg (DE)

( * ) Notice: Subject to any disclaimer, the term of this patent is extended or adjusted under 35 U.S.C. 154(b) by 0 days.

(21) Appl. No.: 13/390,153

(22) PCT Filed: Aug. 13, 2010

(86) PCT No.: PCT/EP2010/061798
§ 371 (c)(1),
(2), (4) Date: Mar. 22, 2012

(87) PCT Pub. No.: WO2011/020777
PCT Pub. Date: Feb. 24, 2011

(65) Prior Publication Data
US 2012/0187345 A1 Jul. 26, 2012

(30) Foreign Application Priority Data
Aug. 17, 2009 (EP) .................................. 09167987

(51) Int. Cl.
| | | |
|---|---|---|
| *C09K 15/32* | (2006.01) | |
| *C08K 5/06* | (2006.01) | |
| *A23L 3/3436* | (2006.01) | |
| *C08K 3/08* | (2006.01) | |
| *C08K 3/16* | (2006.01) | |
| *C08K 3/32* | (2006.01) | |

(52) U.S. Cl.
CPC ................ *C08K 5/06* (2013.01); *A23L 3/3436* (2013.01); *C08K 3/08* (2013.01); *C08K 3/16* (2013.01); *C08K 3/32* (2013.01); *C08K 2201/012* (2013.01)

(58) Field of Classification Search
CPC ............. C08K 5/37; C08K 5/57; C08K 3/16; C08K 5/098; A01K 75/00
USPC ....................................... 252/188, 400.2, 407
See application file for complete search history.

(56) References Cited

U.S. PATENT DOCUMENTS

| | | | |
|---|---|---|---|
| 4,104,192 A | 8/1978 | Yoshikawa et al. | |
| 4,856,650 A | 8/1989 | Inoue | |
| 4,992,410 A | 2/1991 | Cullen et al. | |
| 5,153,038 A | 10/1992 | Koyama et al. | |
| 5,350,622 A * | 9/1994 | Speer et al. .................... | 428/215 |
| 5,399,289 A * | 3/1995 | Speer et al. ............... | 252/188.28 |
| 5,425,986 A * | 6/1995 | Guyette ........................ | 428/141 |
| 5,498,364 A * | 3/1996 | Speer et al. ............... | 252/188.28 |
| 5,648,020 A * | 7/1997 | Speer et al. ............... | 252/188.28 |
| 5,744,056 A | 4/1998 | Venkateshwaran | |
| 5,885,481 A | 3/1999 | Venkateshwaran et al. | |
| 6,369,148 B2 | 4/2002 | Chiang et al. | |
| 6,387,864 B1 * | 5/2002 | Bartelme ...................... | 510/336 |
| 6,455,620 B1 * | 9/2002 | Cyr et al. ...................... | 524/376 |
| 6,586,514 B2 * | 7/2003 | Chiang et al. .................. | 524/417 |
| 8,152,902 B2 * | 4/2012 | Wood et al. ...................... | 95/144 |
| 2002/0123446 A1 * | 9/2002 | Meyer et al. .................. | 510/367 |
| 2004/0234797 A1 * | 11/2004 | Schwark et al. ........... | 428/474.4 |
| 2006/0069197 A1 * | 3/2006 | Tammaji et al. .............. | 524/440 |
| 2007/0098936 A1 | 5/2007 | Tung et al. | |
| 2007/0200091 A1 | 8/2007 | Rollick | |
| 2011/0017611 A1 | 1/2011 | Menozzi | |
| 2011/0105639 A1 | 5/2011 | Menozzi | |

FOREIGN PATENT DOCUMENTS

| | | | | |
|---|---|---|---|---|
| EP | 1423456 A1 | 6/2004 | | |
| EP | 1640408 A | 3/2006 | | |
| EP | 1892262 A | 2/2008 | | |
| EP | 1892262 A1 * | 2/2008 | ........... | C08K 5/3492 |
| JP | 11-33395 A | 2/1999 | | |
| JP | 11-506694 A | 6/1999 | | |
| JP | 2002-506904 | 3/2002 | | |
| WO | WO 96/40412 A2 | 12/1996 | | |
| WO | 0110947 A | 2/2001 | | |
| WO | 2006/089895 A1 | 8/2006 | | |
| WO | 2008/008715 A | 1/2008 | | |
| WO | 2009/805586 A2 | 7/2009 | | |
| WO | 2009/135783 A1 | 11/2009 | | |

OTHER PUBLICATIONS

Byun et al. (Journal of Food Engineering, 100, 2010, 239-244).*
Copending U.S. Appl. No. 13/390,149, filed Feb. 13, 2012.
English language abstract of JP 54158386.
English language abstract of JP 56121634.
Patent Abstracts of Japan 56-60642.
Patent Abstracts of Japan 57024634.

* cited by examiner

*Primary Examiner* — Nicole M Buie-Hatcher
*Assistant Examiner* — M. Reza Asdjodi
(74) *Attorney, Agent, or Firm* — Oblon, McClelland, Maier & Neustadt, L.L.P.

(57) ABSTRACT

An oxygen-scavenging composition comprising (I) an oxidizable metal component, (II) an electrolyte component, (III) a non-electrolytic, acidifying component, and (IV) a non ionic surfactant component, preferably selected from the group consisting of alkyl polyethylene glycol ethers, polyethylene glycols, polypropylene glycols, polypropylene glycol polyethylene glycol block copolymers and polyethylene polyethylene glycol block copolymers.

22 Claims, No Drawings

USE OF NON-IONIC SURFACTANTS TO INCREASE OXYGEN SCAVENGER ACTIVITY OF FUNCTIONALIZED POLYOLEFIN FILMS

There are many products which have to be kept in a closed volume or packaged with little or almost no oxygen. These oxygen-sensitive products include pharmaceuticals, food products, meats, beverages, etc which are susceptible for degradation due to the presence of oxygen Limiting the exposure to oxygen provides a means to maintain and enhance the quality and shelf-life of the packaged product. The removal of oxygen from the packaged foods and building barriers against oxygen penetration during storage represents an important objective for the food packaging technologist. For example packaging a food product in a package capable of minimizing oxygen exposure is a means to maintain the quality of the packaged product over an extended time and to retard spoilage of the product so that it is maintained in invent-tory longer without wastage and the need of restocking and replacement.

In the food packaging industry, several techniques have been developed to limit oxygen sensitive packaged materials to oxygen exposure. Such techniques include the use of barrier material (with low permeability to oxygen) as part of the packaging; the inclusion of some means capable of consuming oxygen other then the packaging material (through the use of sachets with material capable of reacting with oxygen); and the creation of a reduced oxygen environment within the package (e.g. modified atmosphere packaging-MAP- and vacuum packaging).

Even if each of the above techniques has its place in the industry, it is well recognized that the inclusion of an oxygen scavenger as a part of the packaging article is one of the most desirable means of limiting oxygen exposure.

Product sensitive to oxygen, particularly foods, beverages and medicines, deteriorate or spoil in the presence of oxygen. One approach to reducing these difficulties is to package such products with packaging materials containing at least one layer of a so-called "passive" gas barrier film that can act as a physical barrier to transmission of oxygen but does not react with oxygen. Films of ethylene vinyl alcohol copolymer (EVOH) or polyvinylidene dichloride (PVDC) are commonly used for this purpose due to their excellent oxygen barrier properties. By physically blocking transmission of oxygen, these barrier films can maintain or substantially maintain initial oxygen levels within a package. Because passive barrier films can add cost to a packaging construction and do not reduce levels of oxygen already present in the packaging construction, however, there is a need for effective, lower cost alternatives and improvements.

An approach to achieving or maintaining a low oxygen environment inside a package is to use a packet containing an oxygen absorbent material. The packet, also sometimes referred to as a pouch or sachet, is placed in the interior of the package along with the product. Sakamoto et al. discloses oxygen absorbent packets in Japan Laid Open Patent Application No. 121634/81 (1981). A typical ingredient used in the oxygen scavenger carried in the packet is reduced iron powder which can react with oxygen to form ferrous oxide or ferric oxide, as disclosed in the U.S. Pat. No. 4,856,650. Also, is known to include in the packet, along with iron, a reaction promoter such as sodium chloride, and a water-absorbing agent, such as silica gel, as described in the U.S. Pat. No. 4,992,410. Japan Laid Open Patent Application No. 82-24634 (1982) discloses an oxygen absorber composition comprising 100 parts by weight (pbw) iron powder, 2 to 7 pbw ammonium chloride, 8 to 15 pbw aqueous acid solution and 20 to 50 pbw of a slightly water soluble filler such as activated clay. Japan Laid Open Patent Application No. 79-158386 (1979) discloses an oxygen arresting composition comprising a metal, such as iron, copper or zinc, and optionally, a metal halide such as sodium chloride or zinc chloride at a level of 0.001 to 100 pbw to 1 pbw of metal and a filler such as clay at a level of 0.01 to 100 pbw to 1 pbw of metal.

Although oxygen absorbent or scavenger materials used in packets can react chemically with oxygen in the package, also sometimes referred to as "headspace oxygen", they do not prevent external oxygen from penetrating into the package. Therefore, it is common for packaging in which such packets are used to include additional protection such as wrappings or passive barrier films of the type described above. This adds to product costs. With many easy-to-prepare foods, another difficulty with oxygen scavenger packets is that consumers may mistakenly open them and consume their contents together with the food. Moreover, the extra manufacturing step of placing a packet into a container can add to the cost of the product and slow production. Further, oxygen absorbent packets are not useful with liquid products.

In view of these disadvantages and limitation, it has been proposed to incorporate directly into the walls of a packaging article a so-called "active" oxygen absorber, i.e., one that reacts with oxygen. Because such a packaging article is formulated to include a material that reacts with oxygen permeating its walls, the packaging is said to provide an "active-barrier" as distinguished from passive barrier films which block transmission of oxygen but do not react with it. Active-barrier packaging is an attractive way to protect oxygen-sensitive products because it not only can prevent oxygen from reaching the product from the outside but also can absorb oxygen present within a container. One approach for obtaining active-barrier packaging is to incorporate a mixture of an oxidizable metal (e.g., iron) and an electrolyte (e.g., sodium chloride) into a suitable resin, melt process the result into monolayer or multilayer sheets or films and form the resulting oxygen scavenger-containing sheets or films into rigid or flexible containers or other packaging articles or components. This type of active-barrier is disclosed in Japan Laid Open Patent Application No. 56-60642 (1981), directed to an oxygen-scavenging sheet composed of a thermoplastic resin containing iron, zinc or copper and a metal halide. Disclosed resins include polyethylene and polyethylene terephthalate. Sodium chloride is the preferred metal halide. Component proportions are such that 1 to 500 parts metal halide are present per 100 parts resin and 1 to 200 parts metal halide are present per 100 part metal. Similarly, the U.S. Pat. No. 5,153,038 discloses plastic multilayer vessels of various layer structures formed from a resin composition formed by incorporating an oxygen scavenger, and optionally a water absorbing agent, in a gas barrier resin. The oxygen scavenger can be a metal powder such as iron, low valence metal oxides or reducing metal compounds. The oxygen scavenger can be used in combination with an assistant compound such as a hydroxide, carbonate, sulfite, thiosulfite, tertiary phosphate, secondary phosphate, organic acid salt or halide of an alkali metal or alkaline earth metal. The water absorbing agent can be an inorganic salt such as sodium chloride, calcium chloride, zinc chloride, ammonium chloride, ammonium sulfate, sodium sulfate, magnesium sulfate, disodium hydrogenphosphate, sodium dihydrogenphosphate, potassium carbonate or sodium nitrate. The oxygen scavenger can be present at 1 to 1000 weight-% based on weight of the barrier resin. The water absorbing agent can be present at 1 to 300 weight-% based on weight of the barrier resin.

One difficulty with scavenger systems incorporating an oxidizable metal (e.g., iron) and a metal halide (e.g., sodium chloride) into a thermoplastic layer is the inefficiency of the oxidation reaction. To obtain sufficient oxygen absorption in active-barrier packaging, high loadings of scavenger composition are often used. This typically requires that sheets, films and the other packaging layer or wall structures containing a scavenging composition be relatively thick. This, in turn, contributes to cost of packaging material and may preclude attainment of thin packaging films having adequate oxygen-scavenging capabilities.

Another oxygen-scavenging composition, disclosed in the U.S. Pat. No. 4,104,192, comprises a dithionite and at least one compound having water of crystallization or water of hydration. Listed among these compounds are various hydrated sodium salts, including carbonate, sulfate, sulfite and phosphates; sodium pyrophosphate decahydrate is specifically mentioned. As disclosed in Table 1, Example 1 of the patent, sodium pyrophosphate decahydrate was the least effective of the compounds tested. In addition, use of hydrate containing compounds may not suitable in oxygen-scavenging resins that require high temperature processing. The U.S. Pat. No. 5,744,056, U.S. Pat. No. 6,369,148 and U.S. Pat. No. 6,586,514 describe an oxygen scavenging composition comprising an oxidizable metal component, an electrolyte component, and a non-electrolytic acidifying component that is thermally stable at thermoplastic resin melt fabrication temperatures.

WO2006/089895 discloses a similar system wherein the electrolytic component participating in the oxidation reaction is obtained by hydrolysis of a Lewis acid salt and/or its adducts. One difficulty with scavenger systems of this type is the relative inefficiency of the oxidation reaction within the polymer matrix. Indeed, the scavenger composition must be employed usually at high loading, leading to cost, compatibility, transparency and color issues. In EP-A-1 423 456 the concentration of the metal is limited to less than 0.25% in order to obtain a more transparent plastic object, limiting significantly its effectiveness. Thus, while a variety of approaches to maintaining or reducing oxygen levels in packaged items have been advanced, there remains a need for improved oxygen-scavenging composition and packaging materials utilizing the same.

An object of the present invention is therefore to provide improved oxygen-scavenging compositions and packagings. Another object is to provide low costs, oxygen-scavenging compositions of improved efficiency. Another object is to provide oxygen scavenging composition that can be used effectively, even at relatively low levels, in a wide range of active-barrier packaging films and sheets, including laminated and coextruded multilayer films and sheets. Another object is ti provide active-barrier packaging containers that can increase the shelf-life of oxygen-sensitive products by slowing the passage of external oxygen into the container, by absorbing oxygen present inside the container or both. Other objects will be apparent to those skilled in the art.

It has been observed that the addition of non ionic surfactants like alkylpolyethylene glycol ethers from linear, saturated $C_{16}$-$C_{18}$ fatty alcohols; or saturated, predominantly unbranched $C_{13}$-$C_{50}$ oxo-alcohols; polypropylene glycols and polypropylene-block-polyethylene glycol copolymers which are thermally stable at temperature generally used for processing thermoplastic resin, and used in combination with electrolytes and non electrolytic acidifying components in addition of oxidizable metal particles (such as those described in U.S. Pat. No. 5,744,056, U.S. Pat. No. 6,369,148, U.S. Pat. No. 6,586,514, and WO2006/089895), specifically particles whose larger dimension is comprised between 1000 µm and 10 µm, most preferably between 10 µm and 300 µm, ad in particular in the range of 10 µm and 50 µm to increase the quantity of oxygen able to react with each unit of metal.

Thus the oxidation reaction occurs more readily and the overall oxygen scavenging performance can be accelerated. This greater reactivity can be exploited, practically, either in order to achieve greater rates and amounts of reaction (greater scavenging ability and speed) or, by reducing the quantity of scavenging composition put in contact with the target environment, in order to achieve the same rates and amounts of reaction with a plastic film or container even more clear and transparent.

Thus, the present invention relates to an oxygen-scavenging composition, a composition comprising a polymeric resin and said oxygen-scavenging composition, an article containing said composition, a masterbatch containing said oxygen-scavenging composition and the use of said oxygen-scavenging composition in food packaging.

Thus, the present invention relates to an oxygen-scavenging composition comprising
(I) an oxidizable metal component,
(II) an electrolyte component,
(III) a non-electrolytic, acidifying component, and
(IV) a non ionic surfactant component, preferably selected from the group consisting of alkyl polyethylene glycol ethers, polyethylene glycols, polypropylene glycols, polypropylene glycol polyethylene glycol block copolymers and polyethylene polyethylene glycol block copolymers.

An article containing said oxygen-scavenging composition, a masterbatch containing said oxygen-scavenging composition and the use of said oxygen-scavenging composition in food packaging.

The oxidizable metal of the invention can be Al, Mg, Zn, Cu, Fe, Sn, Co or Mn, although Fe is preferred for the balance of cost and reactivity. Alloys or blends of such metals, or of such metals with other components, are also suitable. The particles can be of any shape, such as spherical, octahedral, cubic, in the form of rods or platelets and so on. They can be functionnalized for better dispersion in the polymeric matrix or for optimal reactivity. However, preferred metal particles are not functionalized or stabilized by specific binding or interaction with polymeric, organic or organometallic compounds impermeable to oxygen transport.

The sum of oxidizable metal, electrolyte, non-electrolytic acidifying component and non ionic surfactant can comprise from 5 to 50% of total composition, the balance being polymer resin.

The weight ratio of electrolyte to non-electrolytic acidifying component can vary from 10/90 to 90/10. The sum of electrolyte and non-electrolytic acidifying component can be 20 to 500 parts by weight per 100 parts metal.

In addition the weight ratio of non ionic surfactant to electrolyte can vary from 10/90 to 90/10. The sum of electrolyte and non ionic surfactant can be 20 to 500 parts by weight per 100 parts metal.

The non-electrolytic, acidifying component includes various non-electrolytic organic and inorganic acids and their salts. Examples of particular compounds include anhydrous citric acid, citric acid monosodium salt, ammonium sulfate, magnesium sulfate, disodium dihydrogen pyrophosphate, also known as sodium acid pyrophosphate ($Na_2H_2P_2O_7$), sodium metaphosphate, sodium trimetaphosphate, sodium hexametaphosphate, citric acid disodium salt, ammonium phosphate, aluminum sulfate, nicotinic acid, aluminum ammonium sulfate, sodium phosphate monobasic and aluminum potassium sulfate. Combinations of such materials also can be used.

A particularly preferred non-electrolytic, acidifying component comprises as component (III) an alkali metal acid pyrophosphate or an alkaline earth metal acid pyrophosphate and optionally in addition as component (IIIa) an alkali metal dihydrogenphosphate (e.g. $NaH_2PO_4$) or an alkaline earth metal dihydrogenphosphate. Preferably, at least 1 part, in particular 1 to 10 parts, by weight of component (IIIa) per 100 parts by weight of component (III) is used.

Particularly preferred non ionic surfactants are alkylpolyethylene glycol ethers preferably made from a linear, saturated $C_{16}$-$C_{18}$ fatty alcohol, having the formula $RO(CH_2CH_2O)_xH$, (1) wherein R is a linear saturated $C_{16}$-$C_{18}$ fatty alcohol residue and x is a number of 11 to 80, preferably 11, 18, 25, 50 and 80 (Lutensol®AT types).

Likewise preferred are non ionic surfactants of the formula (1), wherein R is a $C_{13}$-$C_{15}$ saturated predominantly unbranched oxo alcohol residue and x is a number of 3 to 30, preferably 3, 4, 5, 7, 8, 10, 11 and 30 (Lutensol® AO types).

Likewise preferred as non ionic surfactants are polyethylene or polypropylene glycols of the formula

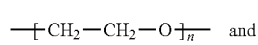
(2)

and

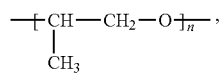
(3)

having a molecular weight in the range of 200 to 12000 g/mol (Pluriol®E types and Pluriol®P types).

Likeweise preferred as non ionic surfactants are block copolymers in which the central polypropylene glycol unit is flanked by two polyethylene units and which have the formula

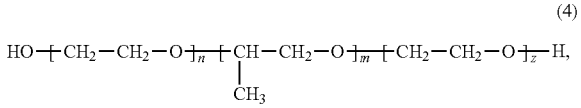
(4)

and a molecular weight in the range of 900 to 3500 g/mol (Pluronic®PE types).

Preferred compounds of formula (4) have 10 to 80%, in particular 40 to 80% by weight of polyethylene glycol in the molecule. The sum of m+n+z is for example a number of 15 to 80.

A particularly preferred oxygen-scavenging composition according to the present invention comprises
(I) an oxidizable metal component,
(II) an electrolyte component selected from the group consisting of NaCl, KCl and $CaCl_2$,
(III) a non-electrolytic, acidifying component, preferably an alkali metal acid pyrophosphate or an alkaline earth metal acid pyrophosphate, and
(IV) a non ionic surfactant component selected from the group containing alkylpolyethylene glycol ethers preferably made from a linear, saturated $C_{16}$-$C_{18}$ fatty alcohol, having the formula $RO(CH_2CH_2O)_xH$, (1) wherein R is a linear saturated $C_{16}$-$C_{18}$ fatty alcohol residue and x is a number of 11 to 80, preferably 11, 18, 25, 50 and 80.

A further particularly preferred oxygen-scavenging composition according to the present invention comprises
(I) an oxidizable metal component,
(II) an electrolyte component selected from the group consisting of NaCl, KCl and $CaCl_2$,
(III) a non-electrolytic, acidifying component, preferably an alkali metal acid pyrophosphate or an alkaline earth metal acid pyrophosphate, and
(IV) a non ionic surfactant component selected from the group containing alkylpolyethylene glycol ethers preferably made from a linear, saturated $C_{13}$-$C_{15}$ fatty alcohol, having the formula $RO(CH_2CH_2O)_xH$, (1) wherein R is a $C_{13}$-$C_{15}$ saturated predominantly unbranched oxo alcohol residue and x is a number of 3 to 30, preferably 3, 4, 5, 7, 8, 10, 11 and 30.

A further particularly preferred oxygen-scavenging composition according to the present invention comprises
(I) an oxidizable metal component,
(II) an electrolyte component selected from the group consisting of NaCl, KCl and $CaCl_2$,
(III) a non-electrolytic, acidifying component, preferably an alkali metal acid pyrophosphate or an alkaline earth metal acid pyrophosphate, and
(IV) a non ionic surfactant component selected from the group containing polyethylene or polypropylene glycols of formulas $HO-[CH_2-CH_2-O]_n-H$ (2) and

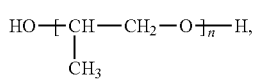
(3)

having a molecular weight in the range of 200 to 12000 g/mol.

A further particularly preferred oxygen-scavenging composition according to the present invention comprises
(I) an oxidizable metal component,
(II) an electrolyte component selected from the group consisting of NaCl, KCl and $CaCl_2$,
(III) a non-electrolytic, acidifying component, preferably an alkali metal acid pyrophosphate or an alkaline earth metal acid pyrophosphate, and
(IV) a non ionic surfactant component selected from the group containing block copolymers in which the central polypropylene glycol unit is flanked by two polyethylene units and which have the formula

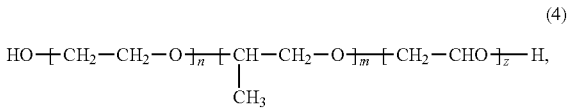
(4)

and a molecular weight in the range of 900 to 3500 g/mol.

A particularly preferred embodiment of the present invention relates to an oxygen-scavenging composition wherein
(I) the oxidizable metal component is iron,
(II) the electrolyte component is NaCl,
(III) the non-electrolytic, acidifying component is $Na_2H_2P_2O_7$, and
(IV) the non ionic surfactant component is selected from the group consisting of alkyl polyethylene glycol ethers, polyethylene glycols, polypropylene glycols, polypropylene glycol polyethylene glycol block copolymers and polyethylene polyethylene glycol block copolymers;
and optionally as component (IIIa) $NaH_2PO_4$.

The components of the present oxygen-scavenging compositions are present in proportions effective to provide oxygen-scavenging effects. Preferably, at least 1 part by weight of electrolyte component plus acidifying component is present per 100 parts by weight of oxidizable metal component, with the weight ratio of electrolyte component to non-electrolytic, acidifying component of e.g. 99:1 to 1:99, in particular 10:90 to 90:10. More preferably, at least about 10 parts of electrolyte plus non-electrolytic, acidifying components are present per 100 parts of oxidizable metal component to promote efficient usage of the latter for reaction with oxy-gen. In order to achieve an advantageous combination of oxidation efficiency, low cost and ease of processing and handling, 20 to 500, in particular 30 to 130 parts of electrolyte plus non-electrolytic, acidifying components per 100 parts of metal component are most preferred.

According to a preferred embodiment, the oxygen-scavenging composition may additionally contain a water-absorbant binder to further enhance oxidation efficiency of the oxidizable metal. The binder can serve to provide additional moisture which enhances oxidation of the metal in the presence of the promoter compounds. Water-absorbing binders suitable for use generally include materials that absorb at least about 5 percent of their own weight in water and are chemically inert. Examples of suitable binders include diatomaceous earth, boehmite, kaolin clay, bentonite clay, acid clay, activated clay, zeolite, molecular sieves, talc, calcined vermiculite, activated carbon, graphite, carbon black, and the like. It is also contemplated to utilize organic binders, examples including various water absorbent polymers are disclosed in EP-A-428,736. Mixtures of such binders can also be employed. Preferred binders are bentonite clay, kaolin clay, and silica gel.

If present, the water-absorbent binder is preferably used in an amount of e.g. 5 to 100 parts per 100 parts of metal. When a binder component is used in compositions compounded into plastics, the binder most preferably is present in an amount of 10 to 50 parts per 100 parts of metal to enhance oxidation efficiency at loading levels low enough to ensure ease of processing.

Another embodiment of the present invention relates to an oxygen-scavenging composition as defined above and containing optionally a conventional additive and further as component (V) an additional polymeric resin different from the inventive non ionic surfactant (IV).

Examples of such polymeric resins are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPEHMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
a) radical polymerisation (normally under high pressure and at elevated temperature).
b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially pvinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

30. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

31. Aqueous emulsions of natural or synthetic rubber, e.g. natural latex or latices of carboxylated styrene/butadiene copolymers.

Any suitable polymeric resin of the above list into which an effective amount of the oxygen-scavenging composition of this invention can be incorporated and that can be formed into a laminar configuration, such as film, sheet or a wall structure, can be used as the plastic resin in the compositions according to this aspect of the invention. Thermoplastic and thermoset resins which can be used are for example nylon 6, nylon 66 and nylon 612, linear and branched polyesters, such as polyethylene terephthalate, polybutylene terephthalate and polyethylene naphthalate, polystyrenes, polycarbonate, polymers of unsubstituted, substituted or functionalized olefins such as polyvinyl chloride, polyvinylidene dichloride, polyacrylamide, polyacrylonitrile, polyvinyl acetate, polyacrylic acid, polyvinyl methyl ether, ethylene vinyl acetate copolymer, ethylene methyl acrylate copolymer, polyethylene, polypropylene, ethylene-propylene copolymers, poly(1-hexene), poly(4-methyl-1-pentene), poly(1-butene), poly(3-methyl-1-butene), poly(3-phenyl-1-propene) and poly(vinylcyclohexane).

Preferred polymers are in particular thermoplastic resins having oxygen permeation coefficients greater than $2 \times 10^{-12}$ $cm^3$ cm $cm^{-2}$ $sec^{-1}$ $cm^{-1}$ Hg as measured at a temperature of 20° C. and a relative humidity of 0% because such resins are relatively inexpensive, easily formed into packaging structures and, when used with the invented oxygen-scavenging composition, can provide a high degree of active barrier protection to oxygen-sensitive products. Examples of these include polyethylene terephthalate and polyalpha-olefin resins such as high, low and linear low density polyethylene and polypropylene. Even relatively low levels of oxygen-scavenging composition, e.g. 5 to 15 parts per 100 parts resin, can provide a high degree of oxygen barrier protection to such resins. Among these preferred resins, permeability to oxygen increases in the order polyethylene terephthalate, polypropylene, high density polyethylene, linear low density polyethylene and low density polyethylene, other things being equal. Accordingly, for such polymeric resins, oxygen scavenger loadings for achieving a given level of oxygen barrier effectiveness increase in like order, other things being equal.

In selecting a thermoplastic resin for use or compounding with the oxygen-scavenging composition of the invention, the presence of residual antioxidant compounds in the resin can be detrimental to oxygen absorption effectiveness. Phenol-type antioxidants and phosphite-type antioxidants are commonly used by polymer manufacturers for the purpose of enhancing thermal stability of resins and fabricated products obtained therefrom. Specific examples of these residual antioxidant compounds include materials such as butylated hydroxytoluene, tetrakis(methylene(3,5-di-t-butyl-4-hydroxyhydrocinnamate)methane and triisooctyl phosphite. Such antioxidants are not to be confused with the oxygen-scavenger components utilized in the present invention. Generally, oxygen absorption of the scavenger compositions of the present invention is improved as the level of residual antioxidant compounds is reduced. Thus, commercially available resins containing low levels of phenol-type or phosphite-type antioxidants, preferably less than about 1600 ppm, and most preferably less than about 800 ppm, by weight of the resin, are preferred (although not required) for use in the present invention. Examples are Dow Chemical Dowlex 2032® linear low density polyethylene (LLDPE); Union Carbide GRSN 7047® LLDPE; Goodyear PET "Traytuf" 9506®; and Eastman PETG 6763®. Measurement of the amount of residual antioxidant can be performed using high pressure liquid chromatography.

If desired, in addition one or more of the following conventional additives might be used in combination with the oxygen scavenger formulation; the list includes for example antioxidants, UV absorbers and/or further light stabilizers such as e.g.:

1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

4. Tocopherols, for example α-tocopherol, β-tocopherol, γ-tocopherol, δ-tocopherol and mixtures thereof (vitamin E).

5. Hydroxylated thiodiphenyl ethers, for example 2,2'-thiobis (6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.

6. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.
7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.
8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl) malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.
9. Aromatic hydroxybenzyl compounds, for example 1, 3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.
10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.
11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.
12. Acylaminophenols, for example 4-hydroxylauranilide, 4-hydroxystearanilide, octyl N-(3,5-di-tert-butyl-4-hydroxyphenyl)carbamate.
13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, 1,2-propanediol, ethylene glycol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.
14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.
15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.
16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.
17. Amides of β-(3,5-di-tert-butyl-4-hydroxyphenyl)propionic acid e.g. N,N'-bis(3,5-di-tert-butyl-4-hydroxyphenylpropionypexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyphydrazide, N,N'-bis[2-(3-[3,5-di-tert-butyl-4-hydroxyphenyl]propionyloxy)ethyl]oxamide (Naugard® XL-1, supplied by Uniroyal).
18. Ascorbic acid (vitamin C)
19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl) diphenylamine, N,N'-dimethyl-N,N'-di-secbutyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis (phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-di-methyl-4H-1,4-benzothiazine, phenothiazine, a mixture of mono- and dialkylated tert-butyl/tertoctylphenothiazines, a mixture of mono- and dialkylated tert-octyl-phenothiazines, N-allylphenothiazine, N,N,N',N'-tetraphenyl-1,4-diaminobut-2-ene.

20. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl] benzotriazole; 2-[2'-hydroxy-3'-(1,1,3,3-tetramethylbutyl)-5'-(α,α-dimethylbenzyl)-phenyl]benzotriazole.

21. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

22. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

23. Acrylates, for example ethyl α-cyano-β,β-diphenylacrylate, isooctyl α-cyano-β,β-diphenylacrylate, methyl α-carbomethoxycinnamate, methyl α-cyano-β-methyl-pmethoxycinnamate, butyl α-cyano-β-methyl-p-methoxy-cinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

24. Sterically hindered amines, for example carbonic acid bis(1-undecyloxy-2,2,6,6-tetra-methyl-4-piperidyl)ester, bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a conden-sate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3, 3,5-trimethyl-2-morpholinone, Sanduvor (Clariant; CAS Reg. No. 106917-31-1], 5-(2-ethylhexanoyl)oxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl) ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

25. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted ox-anilides and mixtures of o- and p-ethoxydisubstituted oxanilides.

26. 2-(2-Hydroxyphenyl)-1,3,5-triazines, for example 2, 4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy) phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine, 2-{hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

When used in combination with resins, the electrolyte and non-electrolytic, acidifying components of the invented oxygen-scavenging composition, and any optional water-absorbent binder that may be used, are e.g. used in particulate or powder form. Particle sizes of at least 290 μm or smaller are preferred to facilitate melt-processing of oxygen-scavenger thermoplastic resin formulations. For use with thermoset resins for formation of coatings, particle sizes smaller than the thickness of the final coating are advantageously employed. The oxygen-scavenger composition can be used directly in powder or particulate form, or it can be processed, for example by melt compounding or compaction-sintering, into pellets to facilitate further handling and use. The mixture of the oxidizable metal component, electrolyte component, non-electrolytic, acidifying component and optional water-absorbent binder can be added directly to a thermoplastic polymer compounding or melt-fabrication operation, such as in the extrusion section thereof, after which the molten mixture can be advanced directly to a film or sheet extrusion or coextrusion line to obtain monolayer or multilayer film or sheet in which the amount of oxygen-scavenging composition is determined by the proportions in which the mixture and resin are combined in the resin feed section of the extrusion-fabrication line. Alternatively, the mixture of the oxidizable metal component, electrolyte component, non-electrolytic, acidifying component and optional binder can be compounded into masterbatch concentrate pellets, which can be further let down into packaging resins for further processing into extruded film or sheet, or injection molded articles such as tubs, bottles, cups, trays and the like.

The degree of mixing of oxidizable metal, electrolyte and non-electrolytic acidifying components and, if used, optional binder component, may affect oxygen absorption performance of the oxygen-scavenging composition with better mixing leading to better performance. Mixing effects may be most noticeable at low electrolyte plus non-electrolytic, acidifying components to oxidizable metal component ratios and at very low and very high non-electrolytic, acidifying component to electrolyte component ratios. Below e.g. 10 parts by weight of electrolyte plus non-electrolytic, acidifying components per 100 parts by weight of metal component, or when the weight ratio of either the electrolyte or non-electrolytic, acidifying component to the other is less than about 10:90, the oxygen-scavenger components are preferably mixed by aqueous slurry mixing followed by oven drying and grinding into fine particles. Below these ratios, mixing by techniques suitable at higher ratios, such as by high-intensity powder mi-xing, as in a Henschel mixer or a Waring powder blender, or by lower intensity mixing techniques, as in a container on a roller or tumbler, may lead to variability in oxygen uptake, particularly when the mixtures are incorporated into thermoplastic resins and used in melt processing operations.

Other factors that may affect oxygen absorption performance of the invented oxygen-scavenging composition include surface area of articles incorporating the compositions, with greater surface area normally providing better oxygen absorption performance. The amount of residual moisture in the water-absorbant binder, if used, also can affect performance with more moisture in the binder leading to better oxygen absorption performance. However, there are practical limits on the amount of moisture that should be present in the binder because too much can cause premature activation of the oxygen-scavenger composition as well as processing difficulties and poor aesthetics in fabricated products. When incorporated into thermoplastic resins and used for fabrication of articles by melt processing techniques, the nature of the resin also can have a significant effect. Thus, when the invented oxygen-scavenging composition is used with amorphous and/or oxygen permeable polymers such as polyolefins or amorphous polyethylene terephthalate, higher oxygen absorption is seen than when the compositions are used with crystalline and/or oxygen barrier polymers such as crystalline polyethylene terephthalate and EVOH.

When used with thermoplastic resins, the oxygen-scavenging composition can be incorporated directly into the resin in amounts effective to provide the desired level of oxygen-scavenging ability. When so-used, preferred oxygen scavenger levels will vary depending on the choice of resin, configuration of the article to be fabricated from the resin and oxygen-scavenging capability needed in the article. Use of resins with low inherent viscosity, e.g., low molecular weight resins, normally permits higher loadings of scavenger composition without loss of processability. Conversely, lesser amounts of oxygen-scavenger composition may facilitate use of polymeric materials having higher viscosities. Preferably, at least 0.1 parts by weight of oxygen-scavenging composition are used per 100 parts by of weight of resin. Loading levels above 200 parts per 100 parts of resin generally do not lead to gains in oxygen absorption and may interfere with processing and adversely affect other product properties. More preferably, loading levels of e.g. 0.2 to 150 parts, in particular 0.3 to 50 parts or 5 to 50 parts, per 100 parts of resin are used to obtain good scavenging performance while maintaining processibility. Loading levels of 0.3 to 20 parts per 100 parts of resin are particularly preferred for fabrication of thin films and sheets.

Preferred oxygen-scavenger resin compositions for fabrication of packaging articles comprise at least one thermoplastic resin and e.g. 2 to 50 parts or 5 to 50 parts by weight of oxygen-scavenging composition per 100 parts by weight of resin, with the oxygen-scavenging composition comprising iron powder as component (I), NaCl, KCl or $CaCl_2$ as component (II) and $Na_2H_2P_2O_7$ or $CaH_2P_2O_7$ as component (III) optionally in combination with $NaH_2PO_4$, $KH_2PO_4$ or $Ca(H_2PO_4)_2$ as component (IIIa). More preferably, e.g. 30 to 130 parts by weight of component (II) plus component (III) (=component (III) plus optionally component (IIIa)) per 10 parts by weight of iron are present in the scavenging composition and the weight ratio of component (II) to component (III) is e.g. 10:90 to 90:10. Up to e.g. 50 parts by weight of water-absorbant binder per 100 parts by weight of resin and oxygen-scavenger also can be included. Especially preferred compositions of this type comprise polypropylene, high, low or linear low density polyethylene or polyethylene terephthalate as the resin, e.g. 5 to 30 parts by weight of oxygen-scavenger per 100 parts by weight of resin. Preferred is e.g. 5 to 100 parts by weight of component (II) and 5 to 70 parts by weight of component (III) per 10 parts by weight of iron and e.g. 0 to 50 parts by weight of binder per 100 parts by weight of components (I), (II), (III) and (IV).

While the oxygen-scavenging composition and resin can be used in a non-concentrated form for direct fabrication of scavenging sheets or films (i.e., without further resin dilution), it also is beneficial to use the oxygen-scavenging composition and resin in the form of a concentrate or masterbatch. When so-used, the ability to produce a concentrate with low materials cost weighs in favor of relatively high loadings of scavenger that will still permit successful melt compounding, such as by extrusion pelletization. Thus, concentrate compositions according to the invention preferably contain at least e.g. 10 parts by weight of oxygen-scavenging composition per 100 parts by weight of resin and more preferably 30 to 150 parts per 100 parts of resin. Suitable resins for such oxygen-scavenging concentrate compositions include any of the thermoplastic polymer resins described herein. Low melt viscosity resins facilitate use of high scavenger loadings and typically are used in small enough amounts in melt fabrication of finished articles that the typically lower molecular weight of the concentrate resin does not adversely affect final product properties. Preferred carrier resins are polypropylene, high density, low density and linear low density polyethylenes and polyethylene terephthalate. Preferred among those are polypropylenes having melt flow rates of e.g. 1 to 40 g/10 min, polyethylenes having melt indices of e.g. 1 to 20 g/10 min and polyethylene terephthalates having inherent viscosities of e.g. 0.6 to e.g. 1 in phenol/trichloroethane.

It is also contemplated to utilize various components of the oxygen-scavenging composition or combinations of such components to form two or more concentrates that can be combined with a thermoplastic resin and fabricated into an oxygen-scavenging product. An advantage of using two or more concentrates is that the electrolyte and non-electrolytic, acidifying components can be isolated from the oxidizable metal until preparation of finished articles, the-reby preserving full or essentially full oxygen-scavenging capability until actual use and permitting lower scavenger loadings than would otherwise be required. In addition, separate concentrates permit more facile preparation of differing concentrations of the electrolyte and non-electolytic, acidifying components and/or water absorbant binder with the oxidizable metal and also enable fabricators to conveniently formulate a wide range of melt-processible resin compositions in which oxygen-scavenging ability can be tailored to specific end use requirements. Preferred components or combinations of components for use in separate concentrates are (a) acidifying component; (b) combinations of oxidizable metal component with water absorbing binder component; and (c) combinations of electrolyte and non-electrolytic acidifying components.

A particularly preferred component concentrate is a composition comprising $Na_2H_2P_2O_7$ or $CaH_2P_2O_7$ and a thermoplastic resin. Such a concentrate can be added in desired amounts in melt fabrication operations utilizing thermoplastic resin that already contains, or to which will be added, other scavenging components, such as a oxidizable metal or combination thereof with an electrolyte, to provide enhanced oxygen-scavenging capability. Especially preferred are concentrates containing e.g. 10 to e.g. 150 parts by weight of component (III) per 100 parts by weight of resin, with polypropylene, polyethylenes and polyethylene tere-phthalate being most preferred resins.

Thus, a further embodiment of the present invention is a masterbatch comprising
(A) a polymeric resin, and
(B) 30 to 150% by weight, based on the polymeric resin, of the oxygen-scavenging composition as described herein.

Polymeric resins that can be used for incorporating the oxygen-scavenging composition into internal coatings of cans via spray coating and the like are typically thermoset resins such as epoxy, oleoresin, unsaturated polyester resins or phenolic based materials.

Another embodiment of the present invention is an article containing a composition as described above. The article may be a film, a laminate (e.g. a coextruded multilayer film), a sheet or a rigid or flexible package (e.g. a food packaging).

In more detail, these articles of manufacture comprise at least one melt-fabricated layer containing the oxygen-scavenging composition as described above. Because of the improved oxidation efficiency afforded by the invented oxygen-scavenging composition, the scavenger-containing layer can contain relatively low levels of the scavenger. The articles of the present invention are well suited for use in flexible or rigid packaging structures. In the case of rigid sheet packaging according to the invention, the thickness of the oxygen-scavenging layer is preferably not greater than e.g. 2500 μm, and is most preferably in the range of 50 to 1300 μm. In the case of flexible film packaging according to the invention, the thickness of the oxygen scavenger layer is preferably not greater than e.g. 250 μm and, most preferably, 10 to 200 μm. Packaging structures according to the invention can be in the form of films or sheets, both rigid and flexible, as well as container or vessel walls and liners as in trays, cups, bowls, bottles, bags, pouches, boxes, films, cap liners, can coatings and other packaging constructions. Both monolayer and multilayer structures are contemplated.

The oxygen-scavenging composition and resin of the present invention afford active-barrier properties in articles fabricated therefrom and can be melt processed by any suitable fabrication technique into packaging walls and articles having excellent oxygen barrier properties that can avoid to include layers of costly gas barrier films such as those based on EVOH, PVDC, metallized polyolefin or polyester, aluminum foil, silica coated polyolefin and polyester, etc. The oxygen-scavenger articles of the present invention also provide the additional benefit of improved recyclability. Scrap or reclaim from the oxygen-scavenging resin can be easily recycled back into plastic products without adverse effects. In contrast, recycle of EVOH or PVDC gas barrier films may cause deterioration in product quality due to polymer phase separation and gelation occurring between the gas barrier resin and other resins making up the product. Nevertheless, it also is contemplated to provide articles, particularly for packaging applications, with both active and passive oxygen barrier properties through use of one or more passive gas barrier layers in articles containing one or more active barrier layers according to the invention. Thus, for some applications, such as packaging for food for institutional use and others calling for long shelf-life, an oxygen-scavenging layer according to the present invention can be used in conjunction with a passive gas barrier layer or film such as those based on EVOH, PVDC, metallized polyolefins or aluminum foil.

The present invention is also preferably directed to a packaging wall containing at least one layer comprising the oxygen-scavenging composition and resin described above. It should be understood that any packaging article or structure intended to completely enclose a product will be deemed to have a "packaging wall," as that term is used herein, if the packaging article comprises a wall, or portion thereof, that is, or is intended to be, interposed between a packaged product and the atmosphere outside of the package and such wall or portion thereof comprises at least one layer incorporating the oxygen-scavenging composition of the present invention. Thus, bowls, bags, liners, trays, cups, cartons, pouches, boxes, bottles and other vessels or containers which are intended to be sealed after being filled with a given product are covered by the term "packaging wall" if the oxygen-scavenging composition of the invention is present in any wall of such vessel (or portion of such wall) which is interposed between the packaged product and the outside environment when the vessel is closed or sealed. One example is where the oxygen-scavenging composition of the invention is fabricated into, or between, one or more continuous thermoplastic layers enclosing or substantially enclosing a product. Another example of a packaging wall according to the invention is a monolayer or multilayer film containing the present oxygen-scavenging composition used as a cap liner in a beverage bottle (i.e., for beer, wine, fruit juices, etc.) or as a wrapping material.

An attractive active-barrier layer is generally understood as one in which the kinetics of the oxidation reaction are fast enough, and the layer is thick enough, that most of the oxygen permeating into the layer reacts without allowing a substantial amount of the oxygen to transmit through the layer. Moreover, it is important that this "steady state" condition exist for a pe-riod of time appropriate to end use requirements before the scavenger layer is spent. The present invention affords this steady state, plus excellent scavenger longevity, in economically attractive layer thicknesses, for example, less than e.g. 2500 μm in the case of sheets for rigid packaging, and less than e.g. 250 μm in the case of flexible films. For rigid sheet packaging according to the present invention, an attractive scavenger layer can be provided in the range of 250 to 750 μm, while for flexible film packaging, layer thicknesses of 20 to 200 μm are attractive. Such layers can function efficiently with as little as e.g. 2 to 10 weight % of oxygen-scavenger composition based on weight of the scavenger layer.

In fabrication of packaging structures according to the invention, it is important to note that the oxygen-scavenging resin composition of the invention is substantially inactive with res-pect to chemical reaction with oxygen so long as the water activity of the composition is not sufficient. In contrast, the composition becomes active for scavenging oxygen when the water activity reaches a particularly level. Water activity is such that, prior to use, the invented packaging articles can remain substantially inactive in relatively dry environments without special steps to maintain low moisture levels. However, once the packaging is placed into use, most products will have sufficient moisture to activate the scavenger composition incor-porated in the walls of the packaging article.

To prepare a packaging wall according to the invention, an oxygen-scavenging resin formula-tion is used or the oxygen-scavenging composition, or its components or concentrates thereof, is compounded into or otherwise combined with a suitable packaging resin whereupon the resulting resin formulation is fabricated into sheets, films or other shaped structures. Extrusion, coextrusion, blow molding, injection molding and any other sheet, film or general polymeric melt-fabrication technique can be used. Sheets and films obtained from the oxygen-scavenger composition can be further processed, e.g. by coating or lamination, to form multilayered sheets or films, and then shaped, such as by thermoforming or other forming operations, into desired packaging walls in which at least one layer contains the oxygen scavenger. Such packaging walls can be subjected to further processing or shaping, if desired or necessary, to obtain a variety of active-barrier end-use packaging articles. The present invention reduces the cost of such barrier articles in comparison to conventional articles which afford barrier properties using passive barrier films.

As a preferred article of manufacture, the invention provides a packaging article comprising a wall, or combination of interconnected walls, in which the wall or combination of walls defines an enclosable product-receiving space, and wherein the wall or combination of walls comprises at least one wall section comprising an oxygen-scavenging layer comprising (i) an ethoxylated additive (ii) an oxidizable metal preferably comprising at least one member selected from the group consisting of Al, Mg, Zn, Cu, Fe, Sn, Co or Mn, and most preferably 0.1 to 100 parts of iron per 100 parts by weight of the resin; (iii) an electrolyte component and a solid, non-electrolytic, acidifying component which in the presence of water has a pH of less than 7, with e.g. 5 to about 150 parts by weight of such components per 10 parts by weight of iron preferably being present and the weight ratio of the non-electrolytic, acidifying component to electrolyte component preferably being about 5/95 to about 95/5; an polymeric resin different from the componet (i) and, optionally, a water-absorbent binder.

A particularly attractive packaging construction according to the invention is a packaging wall comprising a plurality of thermoplastic layers adhered to one another in bonded laminar con-tact wherein at least one oxygen-scavenging layer is adhered to one or more other layers which may or may not include an oxygen-scavenging composition. It is particularly preferred, although not required, that the thermoplastic resin constituting the major component of each of the layers of the packaging wall be the same, so as to achieve a "pseudo-monolayer". Such a construction is easily recyclable.

An example of a packaging article using the packaging wall described above is a two-layer or three-layer dual ovenable tray made of crystalline polyethylene terephthalate ("C-PET") suitable for packaging pre-cooked single-serving meals. In a three-layer construction, an oxygen-scavenging layer of 250 to 500 μm thickness is sandwiched between two non-scavenging C-PET layers of 70 to 250 μm thickness. The resulting tray is considered a "pseudo-monolayer" because, for practical purposes of recycling, the tray contains a single thermoplastic resin, i.e., C-PET. Scrap from this pseudo-monolayer tray can be easily recycled because the scavenger in the center layer does not detract from recyclability. In the C-PET tray, the outer, non-scavenging layer provides additional protection against oxygen transmission by slowing down the oxygen so that it reaches the center layer at a sufficiently slow rate that most of the ingressing oxygen can be absorbed by the center layer without permeating through it. The optional inner non-scavenging layer acts as an additional barrier to oxygen, but at the same time is permeable enough that oxygen inside the tray may pass into the cen-tral scavenging layer. It is not necessary to use a three layer construction. For example, in the above construction, the inner C-PET layer can be eliminated. A tray formed from a single oxygen scavenging layer is also an attractive construction.

The pseudo-monolayer concept can be used with a wide range of polymeric packaging ma-terials to achieve the same recycling benefit observed in the case of the pseudo-mono-layer C-PET tray. For example, a package fabricated from polypropylene or polyethylene can be prepared from a multilayer packaging wall (e.g., film) containing the oxygen-scavenging composition of the present invention. In a two-layer construction the scavenger layer can be an interior layer with a non-scavenging layer of polymer on the outside to provide additional barrier properties. A sandwich construction is also possible in which a layer of scavenger-containing resin, such as polyethylene, is sandwiched between two layers of non-scavenging polyethylene. Alternatively, polypropylene, polystyrene or another suitable resin can be used for all of the layers.

Various modes of recycle may be used in the fabrication of packaging sheets and films according to the invention. For example, in the case of manufacturing a multilayer sheet or film having a scavenging and non-scavenging layer, reclaim scrap from the entire multilayer sheet can be recycled back into the oxygen scavenging layer of the sheet or film. It is also possible to recycle the multilayer sheet back into all of the layers of the sheet.

Packaging walls and packaging articles according to the present invention may contain one or more layers which are foamed. Any suitable polymeric foaming technique, such as bead foaming or extrusion foaming, can be utilized. For example, a packaging article can be obtained in which a foamed resinous layer comprising, for example, foamed polystyrene, foamed polyester, foamed polypropylene, foamed polyethylene or mixtures thereof, can be adhered to a solid resinous layer containing the oxygen-scavenging composition of the present invention. Alternatively, the foamed layer may contain the oxygen-scavenging composition, or both the foamed and the non-foamed layer can contain the scavenging composition. Thicknesses of such foamed layers normally are dictated more by mechanical property requirements, e.g. rigidity and impact strenth, of the foam layer than by oxygen-scavenging requirements.

Packaging constructions such as those described above can benefit from the ability to eliminate costly passive barrier films. Nevertheless, if extremely long shelf life or added oxygen protection is required or desired, a packaging wall according to the invention can be fabricated to include one or more layers of EVOH, nylon or PVDC, or even of metallized polyolefin, metallized polyester, or aluminum foil. Another type of passive layer which may be enhanced by an oxygen-scavenging resin layer according to the present invention is silica-coated polyester or silica-coated polyolefin. In cases where a multilayer packaging wall according to the invention contains layers of different polymeric compositions, it may be preferable to use adhesive layers such as those based on ethylene-vinyl acetate copolymer or maleated polyethylene or polypropylene, and if desired, the oxygen-scavenger of the present invention can be incorporated in such adhesive layers. It is also possible to prepare the oxygen-scavenging composition of the present invention using a gas barrier resin such as EVOH, nylon or PVDC polymer in order to obtain a film having both active and passive barrier properties.

While the focus of one embodiment of the invention is upon the incorporation of the oxygen-scavenging composition directly into the wall of a container, the oxygen-scavenging compo-sition also can be used in packets, as a separate inclusion within a packaging article where the intent is only to absorb headspace oxygen.

A primary application for the oxygen-scavenging resin, packaging walls, and packaging ar-ticles of the invention is in the packaging of perishable foods. For example, packaging articles utilizing the invention can be used to package milk, yogurt, ice cream, cheeses; stews and soups; meat products such as hot dogs, cold cuts, chicken, beef jerky; single-serving pre-cooked meals and side dishes; homemade pasta and spaghetti sauce; condiments such as barbecue sauce, ketchup, mustard, and mayonnaise; beverages such as fruit juice, wine, and beer; dried fruits and vegetables; breakfast cereals; baked goods such as bread, crackers, pastries, cookies, and muffins; snack foods such as candy, potato chips, cheese-filled snacks; peanut butter or peanut butter and jelly combinations, jams, and jellies; dried or fresh seasonings; and pet and animal foods; etc. The foregoing is not intended to be limiting with respect to the possible applications of the invention. Generally speaking, the invention can be used to enhance the barrier properties in packaging materials intended for any type of product which may degrade in the presence of oxygen.

Still other applications for the oxygen-scavenging compositions of this invention include the internal coating of metal cans, especially for oxygen-sensitive food items such as tomato-based materials, baby food and the like. Typically the oxygen-scavenging composition can be combined with polymeric resins such as thermosets of epoxy, oleoresin, unsaturated polyester resins or phenolic based materials and the material applied to the metal can by methods such as roller coating or spray coating.

Thus, a further embodiment of the invention is the use of a mixture comprising components (I) to (IV) as defined above as oxygen-scavenger in food packaging.

An over view of the various applications which are possible for the present oxygen-scavenging composition is described for example in U.S. Pat. No. 5,744,056, U.S. Pat. No. 5,885,481, U.S. Pat. No. 6,369,148 and U.S. Pat. No. 6,586,514, which are incorporated by reference herein.

The examples below illustrate the invention in greater detail. All percentages and parts are by weight, unless stated otherwise.

Comparative Sample 1:

NaCl, $Na_2H_2P_2O_7$ and $NaH_2PO_4$ are mixed with low density polyethylene (Riblene GP20®) so that the ratios NaCl/$Na_2H_2P_2O_7$/$NaH_2PO_4$ are 1/0.92/0.08 by weight, and the final concen-tration of NaCl is 3.5% by weight. Fe particles are added at a concentration (by weight) of 7.0% using common electrolytic iron powder, minus 325 mesh (<44 nm). The compositions are prepared with an OMC pilot double screw extruder (model EBV 19/25, with a 19 mm screw diameter and 1:25 ratio), and 50 micron-thick films are prepared using a Formac Blow Extruder (model Lab25, with a 22 mm screw diameter and 1:25 ratio).

Comparative Sample 2:

NaCl and $Na_2H_2P_2O_7$ are mixed with polypropylene (RD208CF®) so that the ratios $NaCl/Na_2H_2P_2O_7$ are 1/0.50 by weight, and the final concentration of NaCl is 7.0% by weight. Fe particles are added at a concentration (by weight) of 7.0% using common electrolytic iron powder, minus 325 mesh (<44 nm). The compositions are prepared with an OMC pilot double screw extruder (model EBV 19/25, with a 19 mm screw diameter and 1:25 ratio), and 100 micron-thick films are prepared using Collin Cast Flatdie Extruder model 30×25 L/D (30 mm screw diameter, 1:25 diameter/length ratio).

Inventive Sample 1:

NaCl, $Na_2H_2P_2O_7$, $NaH_2PO_4$ and a fatty alkyl polyethylene glycol ether (Lutensol AT25®) are mixed with low density polyethylene (Riblene GP20®) so that the ratios $NaCl/Na_2H_2P_2O_7/NaH_2PO_4$/fatty alkyl polyethylene glycol ether are 1/0.92/0.08/0.57 by weight, and the final concentration of NaCl is 3.5% by weight. Fe particles are added at a different concentration (by weight) of 7.0% using common electrolytic iron powder, minus 325 mesh (<44 nm). Samples are prepared as described for Comparative Sample 1.

Inventive Sample 2:

NaCl, $Na_2H_2P_2O_7$, $NaH_2PO_4$ and a fatty alkyl polyethylene glycol ether (Lutensol AO30®) are mixed with low density polyethylene (Riblene GP20®) so that the ratios $NaCl/Na_2H_2P_2O_7/NaH_2PO_4$/fatty alkyl polyethylene glycol ether are 1/0.92/0.08/0.57 by weight, and the final concentration of NaCl is 3.5% by weight. Fe particles are added at a different concentration (by weight) of 7.0% using common electrolytic iron powder, minus 325 mesh (<44 µm). Samples are prepared as described for Comparative Sample 1.

Inventive Sample 3:

NaCl, $Na_2H_2P_2O_7$, $NaH_2PO_4$ and a polyethylene glycol (Pluriol E1500®) are mixed with low density polyethylene (Riblene GP20®) so that the ratios $NaCl/Na_2H_2P_2O_7/NaH_2PO_4$/polyethylene glycol are 1/0.92/0.08/0.57 by weight, and the final concentration of NaCl is 3.5% by weight. Fe particles are added at a different concentration (by weight) of 7.0% using common electrolytic iron powder, minus 325 mesh (<44 µm). Samples are prepared as described for Comparative Sample 1.

Inventive Sample 4:

NaCl, $Na_2H_2P_2O_7$, $NaH_2PO_4$ and a polyethylene glycol (Pluriol E1500®) are mixed with low density polyethylene (Riblene GP20®) so that the ratios $NaCl/Na_2H_2P_2O_7/NaH_2PO_4$/polyethylene glycol are 1/0.92/0.08/0.41 by weight, and the final concentration of NaCl is 2.45% by weight. Fe particles are added at a different concentration (by weight) of 4.9% using common electrolytic iron powder, minus 325 mesh (<44 µm). Samples are prepared as described for Comparative Sample 1.

Inventive Sample 5:

NaCl, $Na_2H_2P_2O_7$, $NaH_2PO_4$ and a polyethylene glycol (Pluriol E1500®) are mixed with low density polyethylene (Riblene GP20®) so that the ratios $NaCl/Na_2H_2P_2O_7/NaH_2PO_4$/polyethylene glycol are 1/0.92/0.08/0.31 by weight, and the final concentration of NaCl is 3.5% by weight. Fe particles are added at a different concentration (by weight) of 7.0% using common electrolytic iron powder, minus 325 mesh (<44 µm). Samples are prepared as described for Comparative Sample 1.

Inventive Sample 6:

NaCl, $Na_2H_2P_2O_7$, $NaH_2PO_4$ and a polypropylene glycol/polyethylene glycol block copolymer (Pluronic PE6800®) are mixed with low density polyethylene (Riblene GP20®) so that the ratios $NaCl/Na_2H_2P_2O_7/NaH_2PO_4$/polypropylene glycol/polyethylene glycol block copolymer are 1/0.92/0.08/0.57 by weight, and the final concentration of NaCl is 3.5% by weight. Fe particles are added at a different concentration (by weight) of 7.0% using common electrolytic iron powder, minus 325 mesh (<44 µm). Samples are prepared as described for Comparative Sample 1.

Inventive Sample 7:

NaCl, $Na_2H_2P_2O_7$, $NaH_2PO_4$ and a polyethylene block poly(ethylene glycol) (CAS 251553-55-6 from Aldrich) are mixed with low density polyethylene (Riblene GP20®) so that the ratios $NaCl/Na_2H_2P_2O_7/NaH_2PO_4$/polyethylene block poly(ethylene glycol) are 1/0.92/0.08/0.57 by weight, and the final concentration of NaCl is 3.5% by weight. Fe particles are added at a different concentration (by weight) of 7.0% using common electrolytic iron powder, minus 325 mesh (<44 µm). Samples are prepared as described for Comparative Sample 1.

Several aliquots of film for each sample are then exposed to air (20.7% $O_2$) in 500 ml sealed flasks provided with a septum that allowed portions of the inside atmosphere to be drawn for analysis at several intervals using a syringe, in the presence of 15 ml water contained in a vial inside the flasks. Oxygen concentration measures are carried out using a Mocon Pac Check 450 head space analyzer over 28 days. The actual iron concentrations in the samples tested are finally measured by ICP-OES (Inductively Coupled Plasma-Optical Emission Spectrometer, Perkin Elmer Optima Series 4200DV). The results in terms of ml $O_2$/gr of iron are given in Table 1.

TABLE 1

|  | ml $O_2$/gr Iron After 28 Days* |
|---|---|
| Comparative Sample 1 | 32 |
| Inventive Sample 1 | 106 |
| Inventive Sample 2 | 76 |
| Inventive Sample 3 | 92 |
| Inventive Sample 4 | 88 |
| Inventive Sample 5 | 101 |
| Inventive Sample 6 | 62 |
| Inventive Sample 7 | 69 |

*Averaged oxygen scavenger activity (ml $O_2$/gr Iron) for six different LDPE film measured after 28 days.

Table 1 clearly shows that oxygen scavenger activity of Inventive Samples from 1 to 7 is greater than the oxygen scavenger activity of Comparative Sample 1

Inventive Sample 8:

NaCl, $Na_2H_2P_2O_7$ and a polyethylene glycol (Pluriol E1500®) are mixed with polypropylene (RD208CF®) so that the ratios $NaCl/Na_2H_2P_2O_7$/polyethylene glycol are 1/0.5/0.28 by weight, and the final concentration of NaCl is 7.0% by weight. Fe particles are added at a concentration (by weight) of 7.0% using common electrolytic iron powder, minus 325 mesh (<44 µm). Samples are prepared as described for Comparative Sample 2.

Inventive Sample 9:

NaCl, $Na_2H_2P_2O_7$ and a polyethylene glycol (Pluriol E1500®) are mixed with polypropylene (RD208CF®) so that the ratios $NaCl/Na_2H_2P_2O_7$/polyethylene glycol are 1/0.5/0.14 by weight, and the final concentration of NaCl is 7.0% by weight. Fe particles are added at a concentration (by weight) of 7.0% using common electrolytic iron powder, minus 325 mesh (<44 µm). Samples are prepared as described for Comparative Sample 2.

Inventive Sample 10:

NaCl, $Na_2H_2P_2O_7$ and a polyethylene glycol (Pluriol E1500®) are mixed with polypropylene (RD208CF®) so that the ratios $NaCl/Na_2H_2P_2O_7$/polyethylene glycol are 1/0.5/

0.07 by weight, and the final concentration of NaCl is 7.0% by weight. Fe particles are added at a concentration (by weight) of 7.0% using common electrolytic iron powder, minus 325 mesh (<44 μm). Samples are prepared as described for Comparative Sample 2.

Several aliquots of film for each sample are exposed to air (20.7% $O_2$) in 500 ml sealed flasks provided with a septum that allowed portions of the inside atmosphere to be drawn for analysis at several intervals using a syringe, in the presence of 15 ml water contained in a vial inside the flasks. Oxygen concentration measures are carried out at room temperature using a Mocon Pac Check 450 head space analyzer over 28 days. The actual iron concentrations in the samples tested are finally measured by ICP-OES (Inductively Coupled Plasma—Optical Emission Spectrometer, Perkin Elmer Optima Series 4200DV). The results in terms of ml $O_2$/gr of iron are given in Table 2 as average of five different measurements on each film sample.

TABLE 2

|  | ml $O_2$/gr Iron After 28 Days* |
|---|---|
| Comparative Sample 2 | 39 |
| Inventive Sample 8 | 120 |
| Inventive Sample 9 | 115 |
| Inventive Sample 10 | 89 |

*Averaged oxygen scavenger activity (ml $O_2$/gr Iron) for four different PP film measured after 28 days.

Table 2 clearly shows that oxygen scavenger activity of Inventive Samples from 8 to 10 is greater than the oxygen scavenger activity of Comparative Sample 2.

The amount of oxygen adsorbed by the test samples is determined from the change in the oxygen concentration in the head space of a sealed glass container. The test container has a headspace volume of about 500 ml and contains atmospheric air so that about 100 ml of oxygen are available for reaction with the iron particles. In all the examples oxygen scavenger component percentages are in weight percents based on total weight of the film composition.

Detailed Description of Oxygen Uptake Method:

Film thickness is measured and 4.00 grams of film are weighted. The extruded film is folded and placed in a clean 500 ml sealed glass container. A vial containing 15 ml of deionized water is added to produce 100% relative humidity inside the glass container. The oxygen content in the ambient air on day 0 (i.e. equal to the initial oxygen content in the sealed glass container) is tested and recorded using a Mocon Oxygen Analyzer. The glass containers with test films and water vials are stored at 22° C. (generally, room temperature) for 28 days.

The oxygen content in the sealed glass containers using a Mocon Oxygen Analyzer on day 28 are tested and recorded.

Based on the measured oxygen concentration that is left in the sealed glass container the volume of oxygen absorbed per gram of Scavenger has been calculated using the formula:

$$\text{Oxygen absorbed (ml/g)} = \{(\% O_2)_i - (\% O_2)_f\} * 0.01 * V_j / (W_F * W_S / W_B)$$

where:

$(\% O_2)_i$ Initial oxygen concentration in the sealed glass container (%)

$(\% O_2)_f$ Oxygen concentration in the sealed glass container at day of test (%)

0.01: Conversion factor $V_j$: Free air volume of the sealed glass container (ml) (total volume of the sealed glass container less space occupied by vial and film, typically 440 ml)

$W_F$: Weight of film placed into the glass container (typically 4.0 g)

$W_S$: Weight of Oxygen Scavenger used to make blend (g)

$W_B$: Total weight of blend (g)

The invention claimed is:

1. An oxygen-scavenging composition comprising
   (I) an oxidizable metal component,
   (II) an electrolyte component selected from the group consisting of NaCl, KCl and $CaCl_2$,
   (III) an alkali metal acid pyrophosphate or an alkaline earth metal acid pyrophosphate, and
   (IV) at least one non-ionic surfactant component selected from the group consisting of alkyl polyethylene glycol ethers of formula (1)

$$RO(CH_2CH_2O)_xH \qquad (1)$$

wherein either
   R is a linear saturated $C_{16}$-$C_{18}$ fatty alcohol residue and x is a number of 11 to 80, or
   R is a $C_{13}$-$C_{15}$ saturated predominantly unbranched oxo alcohol residue and x is a number of 3 to 30.

2. The oxygen-scavenging composition according to claim 1 wherein R is a linear saturated $C_{16}$-$C_{18}$ fatty alcohol residue and x is a number of 11 to 80.

3. The oxygen-scavenging composition according to claim 1 wherein R is a $C_{13}$-$C_{15}$ saturated predominantly unbranched oxo alcohol residue and x is a number of 3 to 30.

4. The oxygen-scavenging composition according to claim 1 wherein the oxidizable metal is iron.

5. The oxygen-scavenging composition according to claim 1 comprising
   (I) iron,
   (II) NaCl,
   (III) $Na_2H_2P_2O_7$ and
   (IV) at least one non-ionic surfactant selected from the group consisting of alkyl polyethylene glycol ethers of formula (1); and
   optionally further comprising as component (IIIa) $NaH_2PO_4$.

6. The oxygen-scavenging composition according to claim 1 further comprising (V) a polyolefin resin.

7. The oxygen-scavenging composition according to claim 1 further comprising at least one additive selected from the group consisting of
   (C-1) water-absorbent binders,
   (C-2) UV absorbers,
   (C-3) antioxidants and
   (C-4) further light stabilizers.

8. An article comprising the composition of claim 1.

9. The article according to claim 8, which is a film, a sheet or a laminate.

10. The article according to claim 9 which is a coextruded multilayer film.

11. The article according to claim 8 which is a food packaging.

12. The oxygen-scavenging composition according to claim 1 comprising
    (I) iron,
    (II) NaCl, KCl or $CaCl_2$,
    (III) $Na_2H_2P_2O_7$, (IIIa) $NaH_2PO_4$ and
(IV) at least one non-ionic surfactant selected from the group consisting of alkyl polyethylene glycol ethers of formula (1).

13. The oxygen-scavenging composition according to claim 1 comprising
(I) iron,
(II) NaCl,
(III) $Na_2H_2P_2O_7$,
(IIIa) $NaH_2PO_4$ and
(IV) at least one non-ionic surfactant selected from the group consisting of alkyl polyethylene glycol ethers of formula (1).

14. The oxygen-scavenging composition according to claim 1 comprising
(I) iron,
(II) NaCl, KCl or $CaCl_2$,
(III) $Na_2H_2P_2O_7$,
(IIIa) $Na_2H_2PO_4$,
(IV) at least one non-ionic surfactant selected from the group consisting of alkyl polyethylene glycol ethers of formula (1), and
(V) a polyolefin resin.

15. The oxygen-scavenging composition according to claim 1 comprising
(I) iron,
(II) NaCl,
(III) $Na_2H_2P_2O_7$,
(IIIa) $NaH_2PO_4$,
(IV) at least one non-ionic surfactant selected from the group consisting of alkyl polyethylene glycol ethers of formula (1), and
(V) a polyolefin resin.

16. The oxygen-scavenging composition according to claim 1 comprising
(I) iron,
(II) NaCl, KCl or $CaCl_2$,
(III) $Na_2H_2P_2O_7$,
(IIIa) $NaH_2PO_4$,
(IV) at least one non-ionic surfactant selected from the group consisting of alkyl polyethylene glycol ethers of formula (1), and
(V) polyethylene or polypropylene.

17. The oxygen-scavenging composition according to claim 1 comprising
(I) iron,
(II) NaCl,
(III) $Na_2H_2P_2O_7$,
(IIIa) $NaH_2PO_4$,
(IV) at least one non-ionic surfactant selected from the group consisting of alkyl polyethylene glycol ethers of formula (1), and
(V) polyethylene or polypropylene.

18. The oxygen-scavenging composition of claim 1, wherein the composition does not comprise an amine antioxidant.

19. The oxygen-scavenging composition of claim 1, consisting essentially of:
(I) at least one oxidizable metal component,
(II) at least one electrolyte component selected from the group consisting of NaCl, KCl and $CaCl_2$,
(III) at least one alkali metal acid pyrophosphate and/or alkaline earth metal acid pyrophosphate, and
(IV) at least one non-ionic surfactant component selected from the group consisting of alkyl polyethylene glycol ethers of formula (1).

20. The oxygen-scavenging composition of claim 1, consisting of:
(I) at least one oxidizable metal component,
(II) at least one electrolyte component selected from the group consisting of NaCl, KCl and $CaCl_2$,
(III) at least one alkali metal acid pyrophosphate and/or alkaline earth metal acid pyrophosphate, and
(IV) at least one non-ionic surfactant component selected from the group consisting of alkyl polyethylene glycol ethers of formula (1).

21. The oxygen-scavenging composition of claim 1, wherein an oxygen scavenging ability of the composition is greater than an oxygen scavenging ability of an otherwise-identical composition without the non-ionic surfactant.

22. A method of improving an oxygen-scavenging ability of a composition, the method comprising:
including a non-ionic surfactant in a composition in need thereof, thereby obtaining the composition of claim 1,
wherein the non-ionic surfactant is at least one selected from the group consisting of alkyl polyethylene glycol ethers of formula (1).

* * * * *